Figure 1:
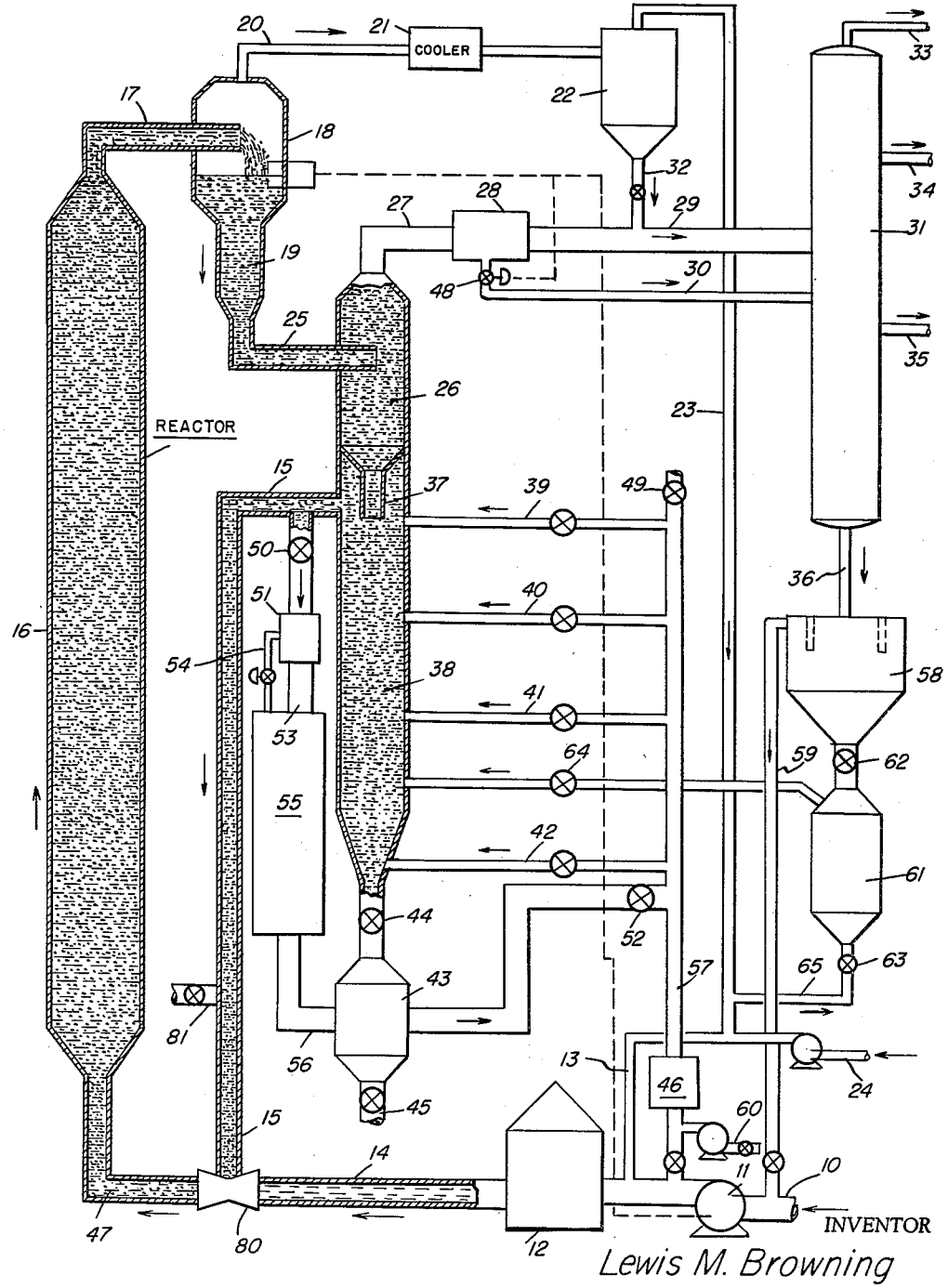

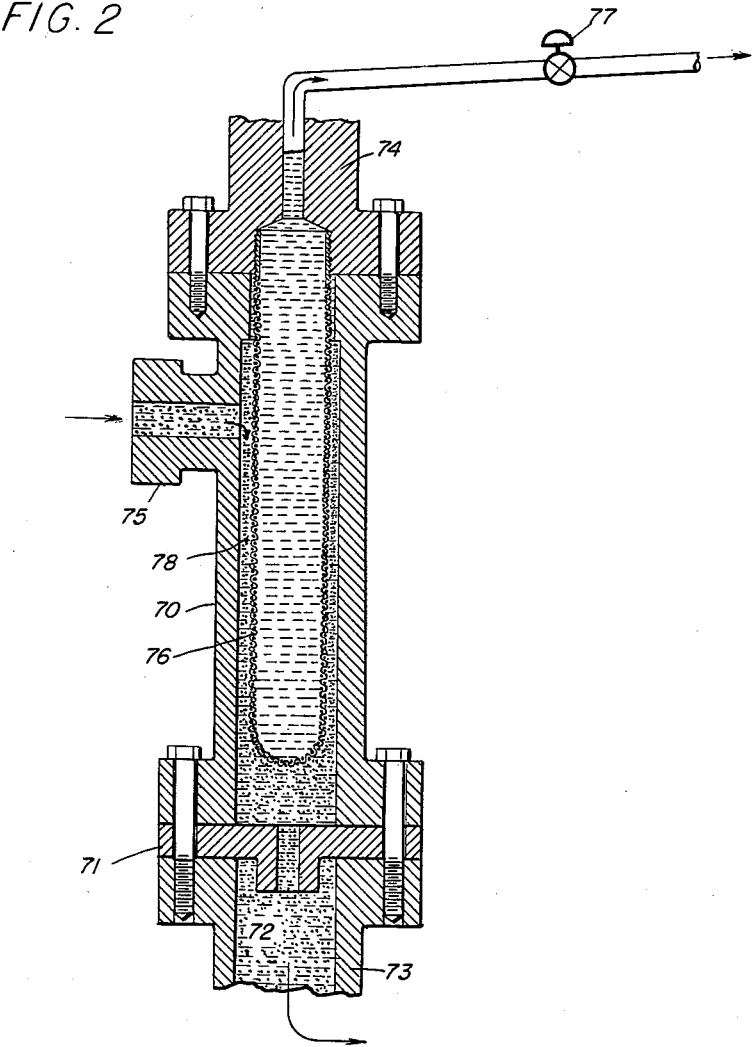

3,079,329
CONVERSION OF LIQUID REACTANTS USING FINELY DIVIDED SOLIDS
Lewis M. Browning, Wenonah, N.J., assignor to Socony Mobil Oil Company, Inc., a corporation of New York
Filed Sept. 14, 1959, Ser. No. 839,902
14 Claims. (Cl. 208—157)

This invention deals with the conversion of liquid reactants to more valuable products in the presence of finely divided solids. More particularly, it relates to the catalytic conversion, especially hydroconversion, of liquid hydrocarbons to lower boiling products in the presence of a finely divided solid catalytic material which does not become immediately deactivated by the catalytic reaction.

Typical of the reactions to which this invention may be applied are the catalytic cracking, reforming, aromatization, dehydrogenation, isomerization, desulfurization and hydrocracking of liquid hydrocarbon reactants, as well as the thermal conversion or cracking of liquid reactants in the presence of inert solids.

Many processes for the conversion of liquid reactants employ solid materials to assist in the conversion. Where the solids are rapidly deactivated, such as in conventional catalytic cracking of hydrocarbons, it is usual to employ beds of solids which are continuously moved between the reaction zone and a regeneration zone in which the solids are reconditioned for re-use. However, where the solid material remains in a useful condition for a relatively long period of time, it is usual to maintain the solid material in a fixed bed through which reactant flows until the solids are deactivated. The solids may then be regenerated in place or may be removed entirely and replaced with a completely new bed of fresh solids. Examples of this type of operation are found in catalytic reforming, desulfurization and hydrocracking of hydrocarbons.

This fixed bed operation has certain pronounced deficiencies, however. First of all, the charge stock always contacts the same solid particles at the various stages of the reaction. Thus, the same solid particles always contact the fresh reactant and the same particles are always subjected to the exiting product. This often leads to differing temperatures at differing levels in the reaction bed which frequently have an undesirable effect on the reaction. Likewise, where the reaction is catalytic, the solid catalyst particles at different bed levels may be contaminated during the reaction to different extents, thereby requiring regeneration at an earlier stage than if the contamination were uniform.

The catalyst particles in fixed bed operations must be of relatively large size in order that flow through the bed without excessive pressure drop can be obtained. However, some catalysts may be more active when used in smaller particles and this additional activity must be sacrificed in the fixed bed operation.

A further disadvantage of the fixed bed operation is that fine particles of foreign matter and catalyst accumulate in the void spaces between particles in the bed, gradually causing an increase in the pressure drop requirement for flow through the bed.

Recognizing the foregoing deficiencies of the fixed bed operation, there have been suggestions in the art that the solid material and the liquid reactant flow through the reaction zone as a slurry. As previously suggested, however, the slurry flow had to be controlled by valves which quickly wore out under the abrasive action of the fine solids. Also, pumps were required to move the slurry about. The pumps did not stand up well under the abrasive action of the solids.

There has now been discovered a technique for reacting liquids in the presence of a suspended, finely divided solid material in which neither control valves nor pumps are subjected to the abrasive action of the suspended solid material. In addition, this invention includes a technique for separating heavy particles of foreign matter from the flowing liquid-solids slurry and a particular technique and apparatus for controlling liquid flow where the liquid is mixed with finely divided solids.

A major object of this invention is to provide a method for the continuous conversion of a liquid reactant using a finely divided solid material suspended in the liquid.

Another object of this invention is to provide a method and apparatus for the continuous catalytic conversion of liquid hydrocarbons to other products in the presence of a finely divided solid catalytic material.

A specific object of this invention is to provide a process for hydrocracking a heavy liquid petroleum charge stock to produce lower boiling products by means of a finely divided solid catalyst which is suspended in the liquid charge stock during the conversion.

Another specific object of this invention is to provide a method and apparatus for controlling the flow rate of a liquid which is carrying suspended solids while avoiding severe erosion of the control mechanism by the solids.

Another specific object is to provide, in a method for the conversion of liquid reactants using a suspended material which is continuously recycled to the conversion zone, a technique for removing from the recycled solid stream heavy solid foreign material.

In one broad aspect, this invention achieves the foregoing objects by providing that the liquid reactant and solid material flow upwardly as a slurry through a confined conversion zone in which the desired reaction occurs. The liquid and solids are removed from the upper section of the conversion zone and passed through an unobstructed passage into a gas separation zone maintained above the lower end of the conversion zone. Any gaseous material may be removed from the upper section of the gas separation zone while liquid and solids settle to the bottom of the zone. The level of liquid in the gas separation zone is maintained substantially constant. Liquid and solids are removed from the lower section of the gas separation zone and flowed to a liquid separation zone, also located above the lower end of the conversion zone. Liquid is removed from the upper section of the liquid separation zone while solids settle to the bottom thereof. These solids are removed through an unobstructed passage and are suspended in a stream of liquid which is to be converted in the conversion zone. This suspension then flows downwardly through an unobstructed passage to join the stream of liquid reactant entering the lower end of the conversion zone. By this means a continuous column of liquid is maintained from the lower end of the conversion zone to the upper liquid surface in the gas separation zone which assists in forcing the finely divided catalyst into the reactant stream entering the conversion without the use of additional force, such as that applied by pumping.

This invention will be best understood by referring to the attached drawings, of which FIGURE 1 is a diagrammatic flow plan of a process employing this invention; and FIGURE 2 is an elevational view, partially in section, of a particular apparatus for controlling the liquid flow rate of liquid streams containing solids, which is a part of this invention.

This invention will be described in connection with a particular process, the hydrocracking of heavy residual petroleum fractions to produce to lower boiling products. By so limiting the description, it is not intended, of course, to limit the scope of the invention which obviously extends to other processes.

Turning now to FIGURE 1, the heavy charge stock which, for example, might be a heavy petroleum fraction boiling above 650° F., enters the system through passage 10 and is pumped by means of pump 11 through heater 12. In heater 12 the charge is heated to the reaction temperature which might be, for example, 800° F. Pump 11 also raises the charge stock to the reaction pressure which might be, for example 1500 p.s.i. Prior to being heated, the charge stock is merged with a stream of hydrogen entering through passage 13 although, if desired, the hydrogen may be heated separately and blended with the charge stock downstream of heater 12.

Charge stock and hydrogen flow from heater 12 through passage 14 and are joined by a stream of catalyst suspended in liquid to be reacted, descending through passage 15. Charge stock, hydrogen, and catalyst form a slurry which flows into and upwardly through reaction zone 16, where the desired conversion to lower boiling products occurs. At all times in reactor 16 the finely divided catalyst is suspended in the upflowing liquid. Catalyst, liquid and any gaseous material, including hydrogen, flow from reactor 16 through passage 17 into a gas separation zone 18 maintained at the reaction zone pressure. In gas separation zone 18 liquid and solids drop to the bottom, forming a liquid body 19. The gaseous material passes overhead through passage 20 and through cooler 21, in which condensible hydrocarbons are condensed. The cooled material then passes to separator 22 where the gaseous materials, mainly hydrogen, are separated from the condensed liquid and pass overhead through passage 23 to supply hydrogen for the reaction to passage 13. Fresh hydrogen may also be added to passage 13 by means of inlet 24. Liquids and solids flow from gas separation zone 18 through unobstructed passage 25 into liquid separation zone 26. The term "unobstructed," as used in connection with passage 25 and elsewhere herein, means that there exists no pump or flow throttling valve or orifice in the particular passage referred to.

Preferably, passage 25 enters zone 26 horizontally and along the walls thereof so that the incoming stream is subjected to centrifugal force which assists in separating solids from the liquid. Of course, if vessel 26 is large enough, simple settling will effect this separation. In any case, a majority of the solids settle downwardly while most of the liquid passes out of the top of zone 26 through passage 27 at a rate controlled by flow control device 28. Some solid material will also flow out with this liquid. Flow control device 28 is described in greater detail hereinbelow and acts to split the liquid into two streams which flow through passages 29 and 30 into fractionation zone 31. Condensed liquid material also flows from separation zone 22 through passages 32 and 29 into fractionation zone 31.

Fractionation zone 31 will normally be operated at atmospheric pressure and will separate, typically, by conventional fractional distillation, the liquid supplied thereto into the desired product, e.g., gasoline, fuel oil and gas oil, which may be removed through passages 33, 34 and 35. In addition, a recycle stream, normally material boiling above 650° F., is withdrawn from the bottom of fractionation zone 31 and handled in a manner described hereinbelow.

Returning to liquid separation zone 26, most of the solids will settle to the bottom of the zone and flow downwardly through unobstructed passage 37 into the upper end of solids separation zone 38. During the circulation of the slurry through the cyclic system, it is inevitable that particles of foreign matter, such as pipe scale and carbonaceous material or coke, will be picked up by the slurry. This foreign matter usually will be heavier than the solid catalyst.

Solids separation zone 38 acts to separate the heavier foreign matter from the finely divided catalyst. This is accomplished by injecting liquid into zone 38 through one or a combination of passages 39, 40, 41 and 42. The upward liquid velocity in zone 38 is adjusted so that solid catalyst will be suspended in the liquid while heavier foreign matter will not be so suspended and will settle to the bottom of zone 38 and into receiver 43. The velocity control is achieved, of course, by controlling the quantity of liquid supplied to zone 38.

The liquid used in zone 38 may be a mixture of recycle oil and fresh charge, such as FIGURE 1 shows, or it may be fresh charge alone or recycle oil alone. The foreign matter which settles into vessel 43 may periodically be removed from the cyclic system by closing valve 44 and draining vessel 43 through passage 45.

It is preferred that a sufficient quantity of liquid be supplied to vessel 38 that there will be a slight liquid upflow through passage 37. This will prevent liquid products from being returned to the conversion zone with recycled catalyst. Of course, the quantity of such upflowing liquid should not be such as to substantially interfere with the downward flow of solids through passage 37.

The liquid flowing through zone 38 may perform another useful function in this invention. Many reactions, for example hydrocracking, are exothermic. Some means must be employed with these reactions to prevent a continual increase in temperature in the conversion zone. This is accomplished in this invention by adjusting the temperature of supply of liquid to zone 38 by means of heat exchanger 46. The temperature of the liquid entering zone 38 should be sufficiently below the reaction temperature, considering the quantity of such liquid, that it will absorb the heat of reaction in being raised to the reaction temperature and thereby maintain the temperature within reaction zone 16 substantially constant.

The solid catalyst, suspended in liquid, flows from the upper section of zone 38 through unobstructed passage 15 downwardly into the liquid flowing in passage 14.

It is a feature of this invention that there is a continuous liquid column from the liquid surface in zone 18 to the bottom of passage 15. This column, by its hydrostatic head, assists in forcing solids into the stream passage 14. In one mode of operation, sufficient gaseous material may be produced and be present in conversion zone 16 that the hydrostatic pressure exerted at the bottom of zone 16, at point 47, is less than the hydrostatic pressure exerted at the lower end of passage 15. When this occurs the stream flowing in 15 will force itself into the stream flowing in 14 and pump 11 need only supply sufficient energy to the liquid charge to raise its pressure to the reaction zone pressure. This mode of operation comes within the broad scope of U.S. patent application Serial Number 762,591, filed September 22, 1958, now U.S. Patent No. 2,968,610.

Alternatively, as shown in FIGURE 1, an eductor 80 may be provided at the lower end of passage 15. In this case, the hydrostatic head at the base of 15 need not exceed the hydrostatic head at point 47 but should be high enough that the stream in 15 will be sucked into the stream in 14 by use of the eductor. The additional energy to accomplish this will be supplied by pump 11. It is to be noted that in neither case is it necessary to employ a pump on the slurry stream.

To accomplish the foregoing, it is necessary that the liquid surface level in gas separation zone 18 be above the lower end of conversion zone 16. The higher this surface the greater the hydrostatic head at the lower end of the stream in 15. The surface should not be above the outlet to passage 17, however, but preferably should be immediately below this outlet.

It is important to control carefully the liquid surface level in zone 18. The level may be measured by any conventional means, for example, by use of a conventional float. This measurement may then be used to control the valve 48 which forms a part of the flow control apparatus described hereinbelow. Since the degree of control afforded by this means is limited, it is preferred in this invention that the level control also act on charge pump 11 and, by varying the operation of this pump either alone or in conjunction with valve 48, maintain the liquid surface level in zone 18 constant.

The processing techniques of the instant invention are particularly applicable when the solid material is not fully deactivated by one passage through the reaction zone and may therefore, at least in part, be continuously recycled to the conversion zone. With catalytic solids some deactivation always occurs, however, which must be dealt with in some manner eventually. Where the catalyst is inexpensive it may be most economical when the catalyst falls below a minimum activity level to shut down the process and replace the catalyst completely with fresh catalyst. The used catalyst removed may be discarded or may be revivified by some suitable procedure, such as burning impurities from the catalyst. Another possibility is to continuously remove a small fraction of the catalyst, for example through passage 81, and replace it with fresh or revivified catalyst, for example through passage 49, thereby maintaining the catalyst activity level constant. Still another possibility is illustrated in FIGURE 1 as an optional procedure. When it is used, valves 50 and 52 might be fully opened. Flow control device 51, of the type described hereinbelow in connection with FIGURE 2, might be used to control the amount of catalyst withdrawn from passage 15. While this device does not directly control solids flow, by controlling the quantity of liquid removed from passage 15 it indirectly controls the quantity of solids also removed. Solids and liquid flow through passages 53 and 54 to revivifier 55. Revivifier 55 may employ any desired technique to remove the carbonaceous contaminant from the catalyst. For example, the revivification procedure might consist of washing the catalyst free of liquid oil with a suitable solvent such as naphtha, removing the solvent by vaporization using superheated steam and burning off the carbonaceous contaminants with an oxygen-containing gas. The revivified catalyst may be returned to system, preferably being picked up by the liquid in passage 57.

Another feature of this invention is a technique for recovery of finely divided solids from fractionator 31 and the return of the solids to the cyclic system. Some solid material will almost always accompany the liquid stream flowing in passage 27 and will find its way into fractionator 31. These solids will accumulate in the recycle oil at the bottom of the fractionator and accompany the stream of recycle oil flowing through passage 36. To avoid pump 11 being subjected to these solids, the stream flowing from 36 is passed into a settler 58. The settler is large enough that the solids drop to the bottom thereof while the solids-free recycle oil is taken off the top of the settler through passage 59. This oil is merged with fresh oil in passage 10. A part or all of it may also, if desired, be used to provide the liquid used in the solids separation zone 38 through passages 60 and 57.

Fines settle from the bottom of settler 58 into receiver 61 and accumulate there. Periodically, however, valve 62 is closed and valves 63 and 64 opened. The opening of 63 is controlled so that an amount of liquid flows from passage 57 through passage 65 into receiver 61 in quantity sufficient to suspend the solids in the receiver and carry them into separation zone 38. When receiver 61 is empty of solids, valves 63 and 64 are closed and valve 62 reopened. It is to be noted that this technique, which is a part of the invention, accomplishes return of the solids to the cyclic conversion system without a shutdown of any part of the continuous operation.

FIGURE 2 illustrates a flow control arrangement which is part of this invention and which may be used advantageously to control the liquid flow rate of any liquid stream carrying suspended solids without subjecting valves and other sensitive mechanisms to the erosive action of the solids. This arrangement consists of an upright cylindrical member 70. Across the lower end of this member is an orifice plate 71 having a flow throttling orifice 72 therein. An outlet passageway 73 leads away from the downstream side of orifice 72. A second outlet passageway 74 leads out of the upper end of cylinder 70 and an inlet passageway 75 extends into the side of cylinder 70 above orifice plate 71 but below the inlet end of passage 74. A cylindrical, thimblelike, foraminous partition or screen 76 surrounds the inlet end of passage 74 and separates it from passage 75. Screen 76 has openings which are smaller than the solids particles suspended in the liquid to be throttled. Orifice plate 71 should be readily replaceable and should be made of some hard material such as 18–8 stainless steel.

In operation, orifice 72 should be sufficiently small that the flow through the orifice alone is not sufficient to give the desired liquid flow rate. The liquid-solids slurry enters through passage 75 and impinges on screen 76. Liquid may pass through the screen but solids cannot. Therefore, all of the solids, plus the liquid which does not flow through the screen, pass downwardly through orifice 72. The quantity of liquid which does pass through screen 76 is controlled by valve 77. This valve, therefore, is used to effect actual flow control of the liquid within a range, the lower limit of which is set by the size of orifice 72. Solids, of course, never reach valve 77. In this device the solids will not clog screen 76 because the pressure drop across the screen will be low due to most of the pressure drop being taken across valve 77. In addition, the swirling action of the incoming slurry helps to remove solids from the screen. Of course, if desired, several of the units illustrated in FIGURE 2 may be used in parallel with the outlets 74 feeding a single passageway in which control valve 77 is situated.

It will be readily apparent from the foregoing that the basic process and apparatus of this invention may be used advantageously to circulate solids slurries in a variety of conversion systems, avoiding contact of the solids with valves and pumps. The invention is particularly favorable for the catalytic hydrocracking of residual petroleum hydrocarbons. In this process, the temperature in reaction zone 16 might be within the range 750–950° F. and the pressure therein might be any pressure from a few hundred pounds per square inch to a few hundred atmospheres. Suitable catalysts for this process are well-known in the art. Most favored catalysts include both a hydrogenation component and a cracking component. Typical materials useful as hydrogenation components include nickel, molybdenum, platinum, palladium, ruthenium, tungsten and cobalt and oxides and sulfides of these materials. The cracking component might be alumina or silica or synthetic composites of alumina and silica or silica and magnesia and like materials.

For use in the process and apparatus of this invention, the circulating solids should generally be of a size within the range 5 to 200 mesh Tyler, and preferably within the range 10 to 100 mesh Tyler.

As indicated above, it is desirable that the liquid velocity in zone 38 be sufficient to suspend the finely divided solid catalyst but insufficient to suspend heavier particles of foreign matter. The actual velocity used will, of course, depend on the relative sizes and densities of the catalyst particles and foreign matter particles and the viscosity of the liquid. A suitable velocity can easily be determined by routine calculations once the various components are selected.

*Example I*

This is an example of the operation of the settling step in this invention. With a catalyst of 48 to 65 mesh Tyler and having a particle density of 65 pounds per cubic foot entrained in a heavy gas oil with particles of foreign matter having a density of 80 pounds per cubic foot, an upward slurry velocity of 2 feet per minute would entrain all of the catalyst and any foreign matter of a size smaller than 28 mesh and carry it out through line 15. Foreign matter larger than 28 mesh would settle out into vessel 43.

*Example II*

This is an example of the operation of the hydrocracking reactor in this invention.

| | |
|---|---|
| Charge stock | Heavy gas oil boiling above 800° F. |
| Catalyst size | 48 to 65 mesh. |
| Catalyst density | 65 lbs. per cubic foot. |
| Reaction pressure | 1500 p.s.i.g. |
| Reaction temperature | 800 to 900° F. |
| Reactor diameter | 7 feet. |
| Reactor length | 92 feet. |
| Slurry velocity in reactor | 3 feet/min. |

*Example III*

In a suitable flow control mechanism design according to FIGURE 2, cylinder 70 might have an inside diameter of 12 inches and screen 76 an inside diameter of 10 inches. Cylinder 70 might be 3 feet high. Where the solids, in entering slurry, are about 65 mesh Tyler, the openings in screen 76 might be 80 mesh Tyler. Where the liquid flow is to be controlled at about 62.5 pounds per second and the pressure drop across the entire flow control device is to be 20 pounds per square inch gauge, orifice 72 might be 2.2 inches in diameter.

It is intended to cover herein all changes and modifications of the examples of the invention chosen for purposes of disclosure which do not constitute departures from the spirit and scope of the invention.

I claim:

1. A process for the continuous conversion of liquid reactant with finely divided solids to produce valuable products in which solids may, at least in part, be continuously recycled through the conversion zone without reactivation, which comprises: flowing a confined stream of liquid reactant into the lower section of a confined conversion zone; passing finely divided solids into said stream prior to its entry into the conversion zone to form a slurry of reactant and solids; flowing said slurry upwardly through said conversion zone and effecting conversion of at least a part of said liquid reactant to more valuable products; flowing liquid and solids from the upper section of said conversion zone into a gas separation zone maintained above the lower end of said conversion zone; withdrawing any gaseous material, accompanying said liquid and solids, from the upper section of said gas separation zone while liquid and solids settle to the bottom of said gas separation zone; flowing liquid and solids from the lower section of the gas separation zone through an unobstructed confined passage into a liquid separation zone maintained above the lower end of said conversion zone and withdrawing liquid from the upper section of said liquid separation zone while solids settle to the lower section thereof; withdrawing solids from the lower section of said liquid separation zone through an unobstructed passage and suspending the solids so withdrawn in liquid material which is to be converted in the conversion zone; flowing the suspension so formed downwardly through an unobstructed passage into said stream of liquid reactant to provide the aforementioned solids for mixing with said reactant to form a slurry therewith; controlling the level of liquid in said gas separation zone substantially constant whereby there is a continuous liquid column from said surface to said stream of liquid reactant which, by hydrostatic pressure, assists in forcing the solids into the stream of fresh reactant.

2. The process of claim 1 further limited to the liquid reactant being a high boiling liquid hydrocarbon and to the conversion reaction being the catalytic conversion of said hydrocarbon to lower boiling products and said solid being a solid catalyst.

3. The process of claim 2 further limited to the conversion reaction being hydrocracking and to hydrogen being continuously added to the conversion zone for use in the hydrocracking reaction.

4. The process of claim 3 further limited to the liquid surface level being maintained substantially constant by controlling the rate at which liquid hydrocarbon reactant is supplied to the lower end of the conversion zone.

5. The process of claim 1 further limited to sufficient liquid material being converted to gaseous material in the conversion zone that the hydrostatic head at the lower end of the conversion zone is less than the hydrostatic head at the lower end of the confined passage containing the suspension of solids flowing from the liquid separation zone whereby said suspension will flow into said stream of liquid reactant and into said conversion zone without the application of additional force.

6. The process of claim 3 wherein the temperature of the liquid in which the catalytic solids leaving the liquid separation zone is suspended is sufficiently below the conversion temperature maintained in the conversion zone to absorb the exothermic heat of the hydrocracking reaction while being heated to the reaction temperature within the conversion zone, thereby maintaining the temperature in the conversion zone relatively constant.

7. The process of claim 2 further limited to a part of the catalytic solids removed from the liquid separation zone being passed to a revivification zone wherein carbonaceous contaminant deposited thereon in the conversion zone is removed and returning the revivified catalytic solids to the reaction zone.

8. A process for the continuous catalytic conversion of liquid hydrocarbons in the presence of a finely divided solid catalyst to produce more valuable hydrocarbon products wherein at least a part of the catalytic solid used to effect the conversion may be continously recycled to the conversion zone without revivification, which comprises: flowing a slurry of liquid hydrocarbon reactant and finely divided solid catalytic material upwardly through a confined conversion zone; removing liquid, solids and any gaseous material from the upper section of the conversion zone into a gas separation zone; maintaining a liquid body in the lower section of said gas separation zone and removing gas from the upper section of said gas separation zone while liquid and solids pass to said liquid body; controlling the surface level of said liquid body substantially constant; flowing liquid and solids from the lower section of said liquid body into a liquid separation zone; removing liquid from the upper section of said liquid separation zone and removing solids from the lower section of said liquid separation zone; passing solids from said liquid separation zone into an elongated solids separation zone; flowing liquid to be converted upwardly through said solids separation zone at a velocity sufficient to suspend said finely divided solid catalytic material but insufficient to suspend heavier particles of foreign matter picked up in the cyclic system, which heavier particles settle to the bottom of said solids separation zone; passing the suspension of finely divided catalytic material in liquid to be converted from the upper section of said solids separation zone into the lower section of the conversion zone.

9. The process of claim 8 further limited to the catalytic reaction being hydrocracking in the presence of hydrogen to produce lower boiling products.

10. The process of claim 8 further limited to solids passing from said liquid separation zone into said solids separation zone through a narrow elongated passage and liquid flowing upwardly from the solids separation zone through said passage to prevent liquid from flowing from said liquid separation zone to said solids separation zone.

11. A process for the hydrocracking of heavy high boiling liquid hydrocarbons to produce lower boiling hydrocarbons, which comprises: flowing a stream of liquid hydrocarbon to be reacted and hydrogen into the lower section of a confined conversion zone; adding to said stream prior to its entry into the conversion zone a finely divided solid hydrocracking catalyst and forming a slurry with said catalyst and said liquid and hydrogen; flowing said slurry upwardly through said conversion zone to effect the desired conversion; removing liquid, gas and solids from the upper section of said conversion zone into a confined gas separation zone, in the lower section of which a body of liquid is maintained, said gas separation zone being maintained above said conversion zone; withdrawing gas from the upper section of the gas separation zone; maintaining the surface level of said liquid body substantially constant; flowing liquid and solids as a confined unrestricted stream from the lower section of said gas separation zone into a liquid separation zone maintained above the lower end of said conversion zone; removing liquid at a controlled rate from the upper section of said liquid separation zone; flowing solids as a confined, unrestricted stream from the lower section of the liquid separation zone into the upper section of a confined elongated solids separation zone; flowing liquid hydrocarbon to be reacted upwardly through the solids separation zone at a velocity sufficient to suspend at least the major portion of the finely divided catalyst but insufficient to support heavier particles of foreign matter which then settle to the bottom of the solids separation zone; removing foreign material from the lower section of said solids separation zone; removing finely divided catalyst suspended in liquid hydrocarbon to be reacted from the upper section of said solids separation zone and passing said suspension downwardly through an unrestricted passage, whereby there is a continuous, unrestricted liquid column from the lower end of said passage to the liquid surface in said gas separation zone; merging said suspension of liquid and catalytic solids with a second stream of liquid to be reacted to form the aforementioned slurry which is supplied to and flows through the reaction zone.

12. The process of claim 11 further limited to the liquid to be reacted which is passed upwardly through the solids separation zone being at a temperature sufficiently below the reaction temperature that the heat required to bring it up to reaction temperature will be about equal to the heat produced by the exothermic hydrocracking reaction and the temperature in the conversion zone will be maintained substantially constant.

13. The process of claim 11 further limited to the liquid hydrocarbon withdrawn from the upper section of the liquid separation zone having suspended therein some finely divided solids; dividing said stream into two substreams, the first containing a major portion of the liquid and substantially all of the finely divided solids and the second containing a minor portion of the liquid substantially free of solids; interposing a fixed opening throttle in said first substream and controlling the rate at which liquid is removed from said liquid separation zone by variably throttling the flow in said second substream.

14. The process of claim 11 further limited to the liquid withdrawn from the upper section of the liquid separation zone containing some finely divided solids; passing said liquid and solids to a fractionation zone in which the liquid is separated into various products, including a heavy recycle oil boiling above 650° F.; passing said recycle oil into a settling zone in which the solids settle out of the recycle oil; removing recycle oil substantially free of solids from the upper section of said settling zone and passing said recycle oil to said conversion zone to be converted to lower boiling products; periodically closing off communication between said fractionation zone and said settling zone and injecting liquid hydrocarbon to be converted into the lower section of said settling zone and flowing said liquid hydrocarbon upwardly therethrough at a sufficient velocity to suspend the solids accumulated therein in the liquid hydrocarbon and passing the suspension so formed into the solids separation zone.

References Cited in the file of this patent

UNITED STATES PATENTS

| | | |
|---|---|---|
| 1,792,003 | Dickey et al. | Feb. 10, 1931 |
| 1,932,673 | Pier et al. | Oct. 31, 1933 |
| 1,991,644 | Wolters | Feb. 19, 1935 |
| 2,030,245 | Crosby et al. | Feb. 11, 1936 |
| 2,142,406 | Nonhebel et al. | Jan. 3, 1939 |
| 2,305,004 | Hemminger | Dec. 15, 1942 |
| 2,313,940 | Hirsch | Mar. 16, 1943 |
| 2,319,199 | Benedict | May 18, 1943 |
| 2,329,930 | Nebeck | Sept. 21, 1943 |
| 2,332,527 | Pyzel | Oct. 26, 1943 |
| 2,441,820 | Jewell | May 18, 1948 |
| 2,780,359 | Hellmann | Feb. 5, 1957 |